United States Patent [19]
Schoofs

[11] Patent Number: 5,946,207
[45] Date of Patent: Aug. 31, 1999

[54] POWER SUPPLY HAVING A SYNCHRONOUS RECTIFIER CIRCUIT FOR IMPROVED SWITCHING TIMING

[75] Inventor: Franciscus A.C.M. Schoofs, Eindhoven, Netherlands

[73] Assignee: U.S. Philips Corporation, New York, N.Y.

[21] Appl. No.: 09/128,152

[22] Filed: Aug. 3, 1998

[30]     Foreign Application Priority Data

Aug. 4, 1997 [EP] European Pat. Off. .............. 97202428
Dec. 22, 1997 [EP] European Pat. Off. .............. 97204072

[51] Int. Cl.[6] ........................... H02M 3/335; H02M 5/42; H02M 7/217
[52] U.S. Cl. ................................. 363/127; 363/89; 363/21
[58] Field of Search ................................. 363/127, 89, 84, 363/21, 80, 78

[56]           References Cited

U.S. PATENT DOCUMENTS 5,396,412  3/1995  Barlage .................................... 363/127
5,818,704  10/1998  Martinez .................................... 363/89

FOREIGN PATENT DOCUMENTS

0464246A1  1/1992  European Pat. Off. ....... H03M 3/335

*Primary Examiner*—Peter S. Wong
*Assistant Examiner*—Bao Q. Vu
*Attorney, Agent, or Firm*—Steven R. Biren

[57]           ABSTRACT

A power supply includes a transformer (TR) having a first winding (N1) for receiving an input signal ($U_i$) and a second winding (N2) for supplying an output signal ($U_o$). Switching means (SM) are coupled in series with the first winding (N1) for switching on and switching off a current through the first winding (N1). A parallel arrangement of a freewheel diode (D) and a field effect transistor (T) is coupled in series with the second winding (N2). The gate of the field effect transistor (T) is controlled from an amplifier (AMP). The amplifier (AMP) compares the drain-source voltage of the field effect transistor (T) with the voltage of a reference voltage source (RF1) and ensures that the drain-source voltage is equal to the voltage of the reference voltage source (RF1) as long as an adequate current flows in the second winding (N2).

7 Claims, 2 Drawing Sheets

POWER SUPPLY HAVING A SYNCHRONOUS RECTIFIER CIRCUIT FOR IMPROVED SWITCHING TIMING

BACKGROUND OF THE INVENTION

The invention relates to a synchronous rectifier comprising a rectifier diode; a transistor having a control electrode, and a main current path between a first main electrode and a second main electrode of the transistor, which main current path is coupled in parallel with the rectifier diode; and a control circuit coupled to the control electrode of the transistor.

Such a power supply is known from the European Patent Specification EP 0 464 246 A1. Said Specification describes a power supply which uses the synchronous rectifier. The power supply comprises switching means which are periodically turned on and turned off, as a result of which an alternating current flows through a first winding of a transformer. This results in an alternating voltage being induced in a second winding of the transformer, which alternating voltage is subsequently rectified. For this purpose, the transistor is turned on and turned off at suitable instants (synchronous rectification). This requires a correct timing for the transistor. This is complicated. Therefore, there is a need for solutions to this timing problem.

SUMMARY OF THE INVENTION

It is an object of the invention to provide a synchronous rectifier which solves the above-mentioned problem in a simple manner.

To this end, according to the invention, the synchronous rectifier of the type defined in the opening paragraph is characterized in that the control circuit comprises an amplifier having a first input coupled to the first main electrode of the transistor, a second input coupled to the second main electrode of the transistor, and an output coupled to the control electrode of the transistor, and a reference voltage source is coupled in series with at least one of the inputs, i.e. the first and the second input, of the amplifier. Together with the transistor the amplifier forms a control loop, as a result of which the voltage across the rectifier diode is equal to a reference voltage supplied by the reference voltage source.

The synchronous rectifier in accordance with the invention can further be characterized in that the power supply further comprises a comparator having a first input coupled to the control electrode of the transistor, a second input coupled to one of the main electrodes of the transistor, and an output for supplying a binary control signal, and a further reference voltage source is coupled in series with one of the inputs, i.e. the first and the second input, of the comparator.

The synchronous rectifier in accordance with the invention can be used in a variety of electronic circuits including a rectifier element, such as power supplies, charge transfer devices, and detection circuits. By way of example, a power supply including a synchronous rectifier in accordance with the invention comprises the switching means and the transformer mentioned in the afore-mentioned Patent Specification, for converting an input voltage between a first and a second input terminal to an output voltage between a first and a second output terminal. Immediately after the switching means have interrupted the current in the first winding a voltage is induced in the second winding. Assuming that a load is arranged between the first and the second output terminal, a current will flow from the second winding through the load and through the parallel arrangement of the rectifier diode, which is also referred to as a freewheel diode, and the transistor. Initially, this current is comparatively large but decreases increasingly as a function of time. As a result of this, the control voltage on the control electrode of the transistor, which control voltage is supplied by the amplifier, is initially comparatively high and decreases increasingly as a function of time. If the current from the second winding is small, the control voltage on the control electrode of the transistor is substantially equal to the so-called threshold voltage of the transistor. Only when the current from the second winding is very small will the control voltage be significantly lower than the threshold voltage of the transistor. A suitable value of the further reference voltage is the threshold voltage of the transistor because in that case the binary control signal on the output of the transistor indicates whether the second winding of the transformer still supplies a significant amount of current.

The power supply in accordance with the invention may comprise a set/reset flip-flop having a set input and a reset input, of which either the set input or the reset input is coupled to the output of the comparator, and an output coupled to the switching means. If the amount of current from the second winding of the transistor has become substantially zero the binary control signal changes. As a result of this, the switching means are turned on again by means of the set/reset flip-flop, so that again a current begins to flow in the first winding. Thus, it is achieved that the current in the first winding is not turned on until the energy transfer from the transformer has been wholly completed. This prevents the efficiency of the energy transfer from being adversely affected by the fact that the current through the first winding is turned on prematurely. The power supply in accordance with the invention may further comprise a resistor having a first and a second terminal, which resistor is coupled in series with the switching means; a still further reference voltage source; and a further comparator having an output coupled to either the set input or the reset input, and having a first and a second input, which first input and second input are coupled between the first and the second terminal of the resistor via the still further reference voltage source. As a result of the increasing current in the first winding the voltage across the resistor will also increase. After a certain time the voltage across the resistor exceeds the still further reference voltage supplied by the still further reference voltage source. As a result of this, the switching means are turned off by means of the set/reset flip-flop, so that the current in the first winding is interrupted. This prevents the current in the first winding from being sustained unnecessarily long, which would adversely affect the efficiency of the energy transfer.

BRIEF DESCRIPTION OF THE DRAWINGS

The invention will now be described in more detail with reference to the accompanying drawings, in which.

In these Figures parts or elements having like functions or purposes bear the same reference symbols.

DESCRIPTION OF THE PREFERRED EMBODIMENTS

Figure 1:
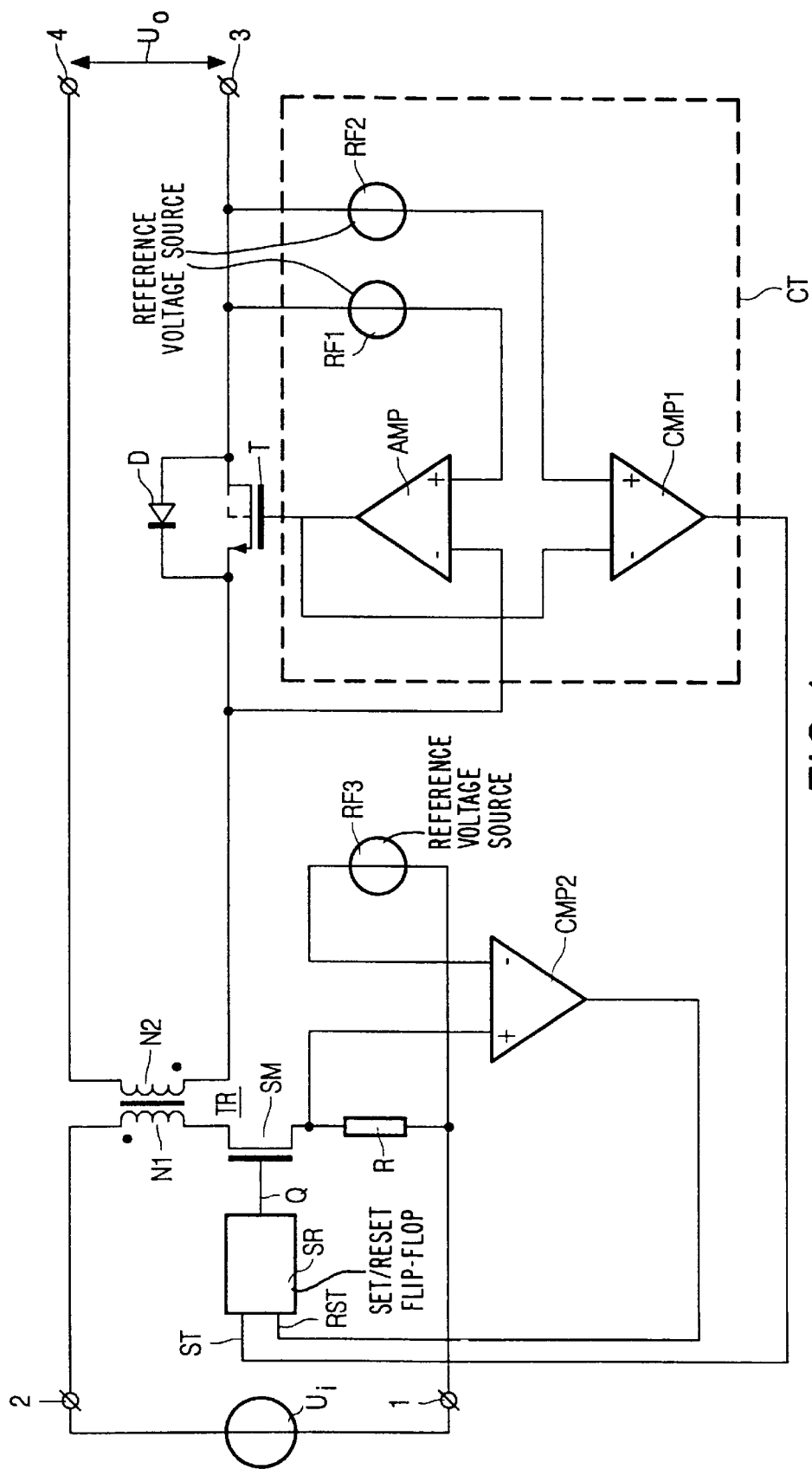
FIG. 1 shows an electrical circuit diagram of an embodiment of a power supply which uses a synchronous rectifier in accordance with the invention.

FIG. 1 shows an electrical circuit diagram of an embodiment of a power supply which uses a synchronous rectifier in accordance with the invention.

The power supply comprises a transformer TR having a first winding N1 and a second winding N2. The first winding N1 is arranged to receive an input voltage $U_i$ which appears between a first input terminal 1 and a second input terminal 2. The second winding is arranged to produce an output voltage $U_o$ between a first output terminal 3 and a second output terminal 4. A transistor, which is for example a field effect transistor T, has a first main electrode, i.e. the source, coupled to the second winding N2 and has a second main electrode, i.e. the drain, coupled to the first output terminal 3. A freewheel diode D is arranged between the source and the drain of the field effect transistor T. In the present embodiment the freewheel diode D is formed by the bulk diode which is intrinsically present in the field effect transistor T. Switching means SM, which are controlled from a set/reset flip-flop SR, are arranged in series with the first winding N1. The power supply further comprises a control circuit CT for controlling the control electrode, i.e. the gate, of the field effect transistor T. The control circuit CT further comprises an amplifier AMP. The amplifier AMP has a first input coupled to the source of the field effect transistor T and has a second input coupled to the drain of the field effect transistor T via a reference voltage source RF1. The amplifier AMP further has an output coupled to the gate of the field effect transistor T. The control circuit CT further includes a comparator CMP1 having a first input coupled to the gate of the field effect transistor T, having a second input coupled to the second main electrode of the field effect transistor T via a further reference voltage source RF2, and having an output coupled to a set input ST of the set/reset flip-flop SR. A resistor R is coupled in series with the switching means SM. A further comparator CMP2 has a first input coupled to a first terminal of the resistor R, has a second input coupled to the first input terminal 1 via a still further reference voltage source RF3, and has an output coupled to a reset input RST of the set/reset flip-flop SR.

The circuit operates as follows. It is assumed that neither any current flows in the first winding N1 nor in the second winding N2 of the transformer TR. It is further assumed that a load (not shown) is arranged between the first output terminal 3 and the second output terminal 4. When the switching means SM are subsequently turned on a current begins to flow in the first winding N1. This induces a voltage in the second winding N2. The induced voltage does not give rise to a current in the second winding N2 because the polarity of the induced voltage is such that the freewheel diode D is cut off and, as a result of this, the control voltage on the output of the amplifier AMP is low. The current through the first winding N1 will rise increasingly. The increase of the current through the first winding N1 decreases as a function of time because the voltage across the resistor R increases more and more, as a result of which the voltage across the first winding N1 decreases more and more. The switching means SM are turned off if the current through the first winding N1 exceeds a given value. This given value is defined by the voltage supplied by the still further reference voltage source RF3. The further comparator CMP2 compares the voltage across the resistor R with the voltage of the still further reference voltage source RF3. If the voltage across the resistor R exceeds the voltage of the still further reference voltage source RF3 the output of the further comparator CMP2 goes "logic high", so that the set/reset flip-flop SR is reset, as a result of which the voltage on the Q output goes "logic low". As a consequence, the switching means SM are turned off, so that the current in the first winding is cut off abruptly. As a result of this, the sign of the voltage induced in the second winding N2 is reversed and a current flows from the second winding through the load and the parallel arrangement of the freewheel diode D and the field effect transistor T. Initially, the current from the second winding N2 will be comparatively large and will subsequently decrease more and more as function of time. By way of example, it is assumed that owing to the reference voltage source RF1 the voltage on the second input of the amplifier AMP is 25 mV higher than the voltage on the drain of the field effect transistor T. If it is further assumed that initially the field effect transistor T does not conduct, the current from the second winding N2 will initially flow wholly through the freewheel diode D. This results in a drain-source voltage across the field effect transistor T, which voltage is approximately equal to the so-called knee voltage of the freewheel diode D. This knee voltage is, for example, 0.7 V. Since the drain-source voltage is higher than the voltage supplied by the reference voltage source RF1, the voltage on the first input of the amplifier AMP becomes negative with respect to the voltage on the second input of the amplifier AMP. As a result of this, the control voltage on the output of the amplifier AMP becomes high (substantially equal to the supply voltage of the amplifier AMP), which causes the field effect transistor T to be driven into full conduction. Consequently, the drain-source voltage of the field effect transistor T decreases drastically and becomes equal to the value (25 mV) of the reference voltage RF1. As a result of this, the current which flows through the freewheel diode D becomes substantially zero. The current from the second winding N2 then flows almost wholly through the field effect transistor T. Since the current from the second winding N2 decreases further as time proceeds the control voltage on the output of the amplifier AMP will decreases more and more. If the current from the second winding N2 is small the voltage on the output of the amplifier AMP will remain substantially constant and will be equal to the so-called threshold voltage of the field effect transistor T. Only when the current from the second winding has become very small (zero) will the control voltage on the output of the amplifier AMP be significantly lower than the threshold voltage of the field effect transistor T. This means, in fact, that the energy transfer of the transformer TR has been completed at the instant at which the control voltage on the output of the amplifier AMP has become significantly lower than the threshold voltage of the field effect transistor T. For the efficiency of the power supply it is favorable to turn on the switching means SM immediately upon completion of an energy transfer so as to enable an amount of energy to be stored again in the transformer TR. Premature turn-on of the switching means SM may result in the efficiency of the energy transfer being reduced. If the voltage of the further reference voltage source RF2 is equal to the threshold voltage of the field effect transistor T the binary control signal appearing on the output of the comparator CMP1 goes "logic high" when the control voltage on the output of the amplifier AMP becomes lower than the threshold voltage of the field effect transistor T. As a result of this, the set/reset flip-flop SR is set, causing the voltage on the Q output to go "logic high". As a consequence of this, the switching means SM are turned on.

The field effect transistor T shown in FIG. 1 is can N-type field effect transistor having its back-gate interconnected to the drain instead of, as is customary, to the source. This has been done because otherwise the bulk diode, which is intrinsically present in the field effect transistor and which is used as the freewheel diode D, does not have the correct polarity. This results in the threshold voltage of the N-type field effect transistor being reduced. Apart from this, it is substantially arbitrary whether the first or the second main electrode of the field effect transistor T is referred to as the source or the drain. The choice made as regards the source and drain in the above description is based on the fact that the current through an N-type field effect transistor generally flows from drain to source. If the field effect transistor T is a discrete N-type field effect transistor this transistor generally has its back-gate interconnected to the main electrode, which is then referred to as the source. For a correct application of such a discrete N-type field effect transistor in the invention this transistor then has its source coupled to the first output terminal 3 and has its drain coupled to the second winding N2. The bulk diode, which is intrinsically present in the discrete N-type field effect transistor and which is used as the freewheel diode D, then has the correct polarity as shown in FIG. 1. The current through the discrete N-type field effect transistor then flows from source to drain.

Figure 2:
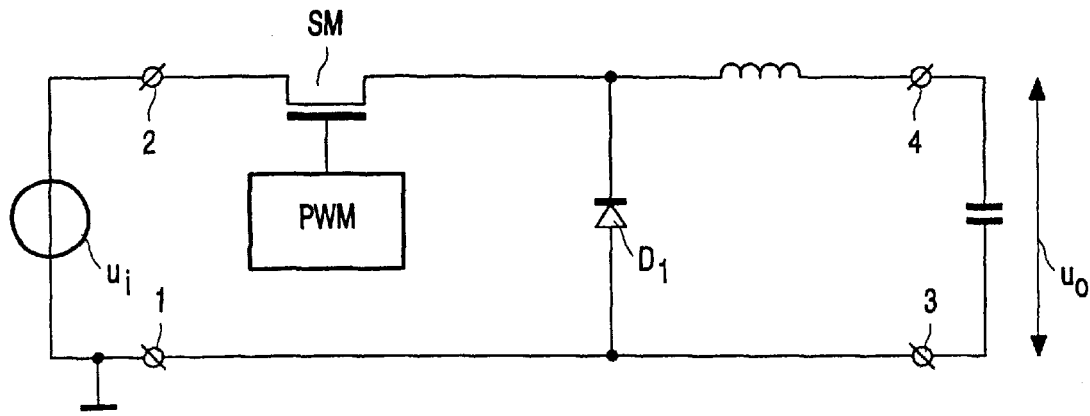
FIG. 2 shows an electrical circuit diagram of a buck converter.
Figure 3:
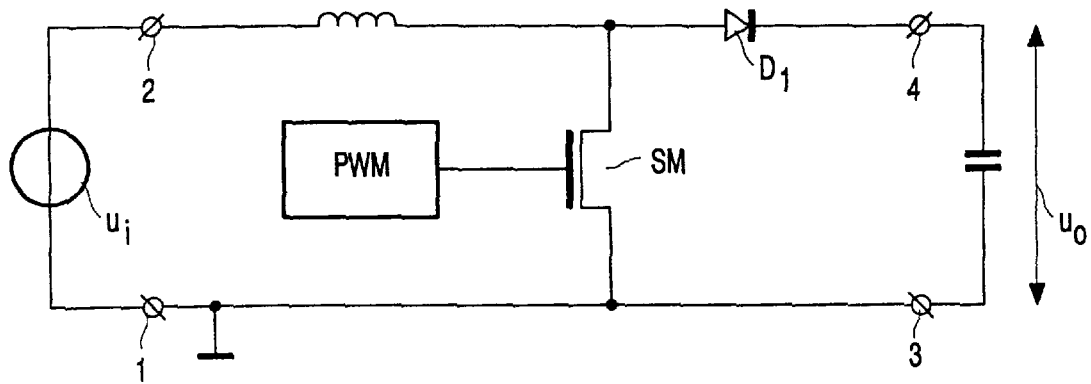
FIG. 3 shows an electrical circuit diagram of a boost converter.
Figure 4:
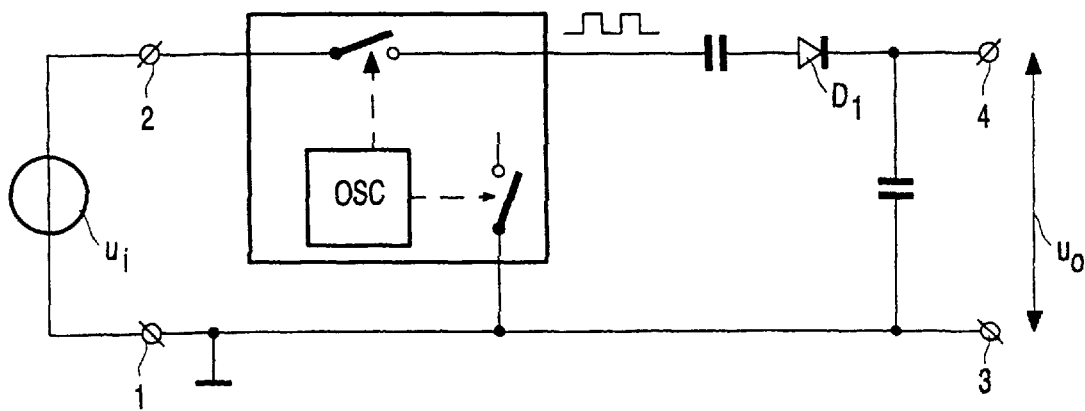
FIG. 4 shows an electrical circuit diagram of a charge transfer device.

The synchronous rectifier in accordance with the invention can also be employed in other electronic circuits in which a rectifier diode is used. For example, the rectifier diode $D_1$ as shown in FIGS. 2, 3 and 4 can be replaced by the synchronous rectifier in accordance with the invention (which can be implemented in a manner equivalent to that shown in FIG. 1).

Alternatively, the field effect transistor T can be replaced by another type of transistor such as a bipolar transistor. Instead of the N-type transistor shown herein it is likewise possible to use a P-type transistor. For the switching means SM various kinds of electronic components can be used, such as relays, transistors, and thyristors. The power supply can be implemented both in an integrated circuit and by means of discrete components.

I claim:

1. A synchronous rectifier comprising a rectifier diode (D); a transistor (T) having a control electrode, and a main current path between a first main electrode and a second main electrode of the transistor (T), which main current path is coupled in parallel with the rectifier diode (D); and a control circuit (CT) coupled to the control electrode of the transistor (T), characterized in that the control circuit (CT) comprises an amplifier (AMP) having a first input coupled to the first main electrode of the transistor (T), a second input coupled to the second main electrode of the transistor (T), and an output coupled to the control electrode of the transistor (T), and a reference voltage source (RF1) is coupled in series with at least one of the inputs, i.e. the first and the second input, of the amplifier (AMP).

2. A synchronous rectifier as claimed in claim 1, characterized in that the power supply further comprises a comparator (CMP1) having a first input coupled to the control electrode of the transistor (T), a second input coupled to one of the main electrodes of the transistor (T), and an output for supplying a binary control signal, and a further reference voltage source (RF2) is coupled in series with one of the inputs, i.e. the first and the second input, of the comparator (CMP1).

3. A power supply including a synchronous rectifier as claimed in claim 1, characterized in that the power supply further comprises an inductive element, and switching means (SM) coupled to the inductive element, for converting an input voltage to an output voltage ($U_o$).

4. A power supply as claimed in claim 3, characterized in that the power supply further comprises a set/reset flip-flop (SR) having a set input (ST) and a reset input (RST), of which either the set input (ST) or the reset input (RST) is coupled to the output of the comparator (CMP1), and an output (Q) coupled to the switching means (SM).

5. A power supply as claimed in claim 4, characterized in that the power supply further comprises a resistor (R) having a first and a second terminal, which resistor (R) is coupled in series with the switching means (SM); a still further reference voltage source (RF3); and a further comparator (CMP2) having an output coupled to either the set input (ST) or the reset input (RST), and having a first and a second input, which first input and second input are coupled between the first and the second terminal of the resistor (R) via the still further reference voltage source (RF3).

6. A power supply as claimed in claim 3, characterized in that the inductive element comprises a transformer (TR) having a first winding (N1) for receiving the input voltage ($U_i$) and a second winding (N2) for supplying the output voltage ($U_o$).

7. An electronic circuit, including a rectifier element, characterized in that the rectifier element is implemented by means of a synchronous rectifier as claimed in claim 1.

* * * * *